May 28, 1929.  P. L. TENNEY ET AL  1,715,077
SYNCHRONIZING TRANSMISSION
Filed July 18, 1928   2 Sheets-Sheet 2
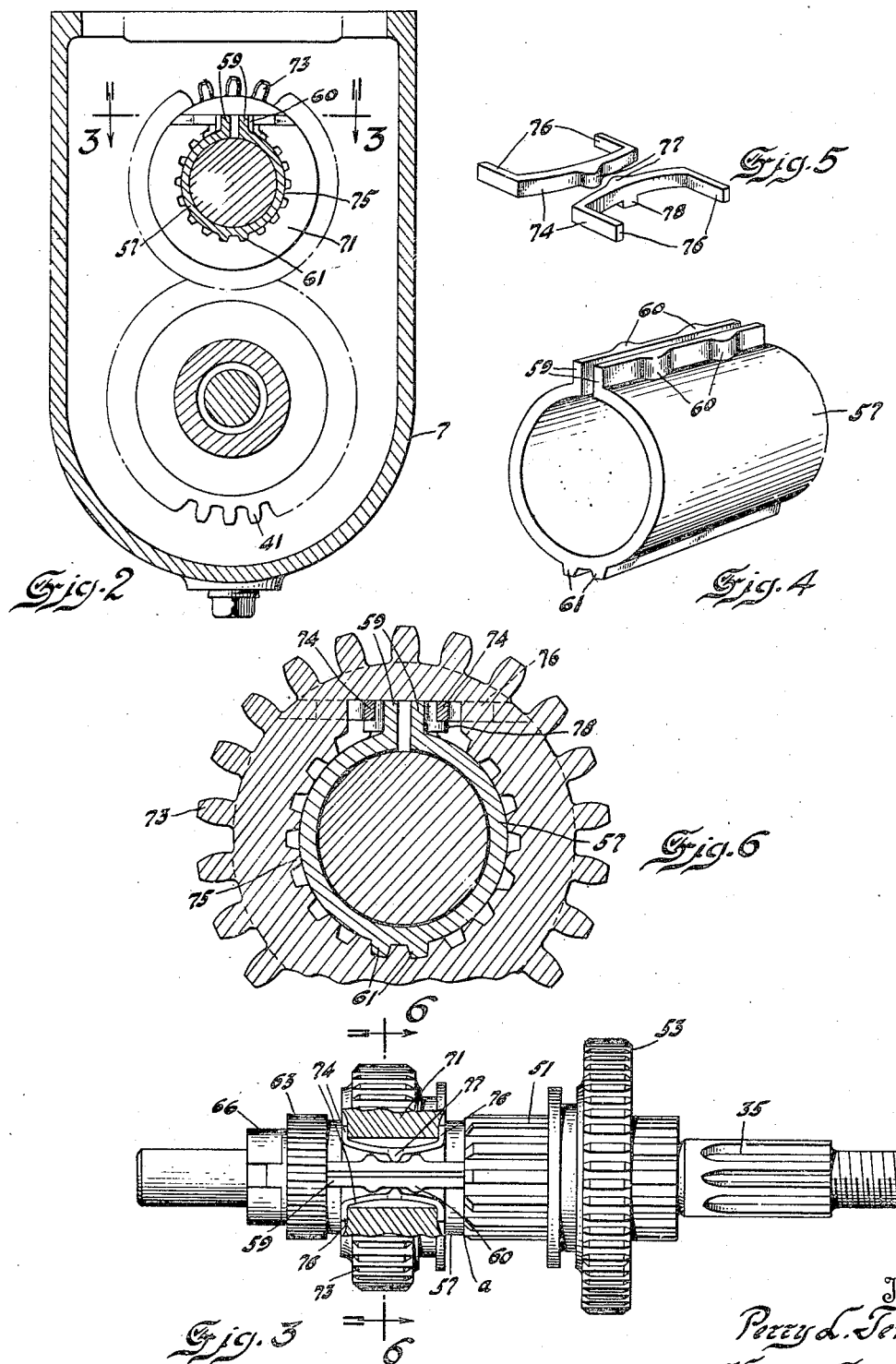

Patented May 28, 1929.

,715,077

UNITED STATES PATENT OFFICE.

PERRY L. TENNEY AND HARRY E. FIDLER, OF MUNCIE, INDIANA, ASSIGNORS TO GENERAL MOTORS CORPORATION, OF DETROIT, MICHIGAN, A CORPORATION OF DELAWARE.

SYNCHRONIZING TRANSMISSION.

Application filed July 18, 1928. Serial No. 293,508.

This invention relates to variable speed transmission mechanism. It has been designed particularly for use in connection with motor vehicles.

An object of the invention is to provide an improved arrangement for changing the driving ratios in a transmission device in which the gears to be meshed may be rotating at unequal speeds, and to make the shift without objectionable noise or shocks.

Another object is to accomplish the above-mentioned object with a minimum departure from conventional construction.

Other objects and advantages will be in part enumerated and in part obvious from the following description.

In the drawing:

Figure 2 is a transverse section on line 2—2 of Figure 1;

Figure 3 is a plan view of the combined driven shaft and sliding gears, partly in section on line 3—3 of Figure 2;

Figure 4 is a perspective of a detail;

Figure 5 represents another detail in perspective; and

Figure 6 is a section on line 6—6 of Figure 3.

Figure 1:
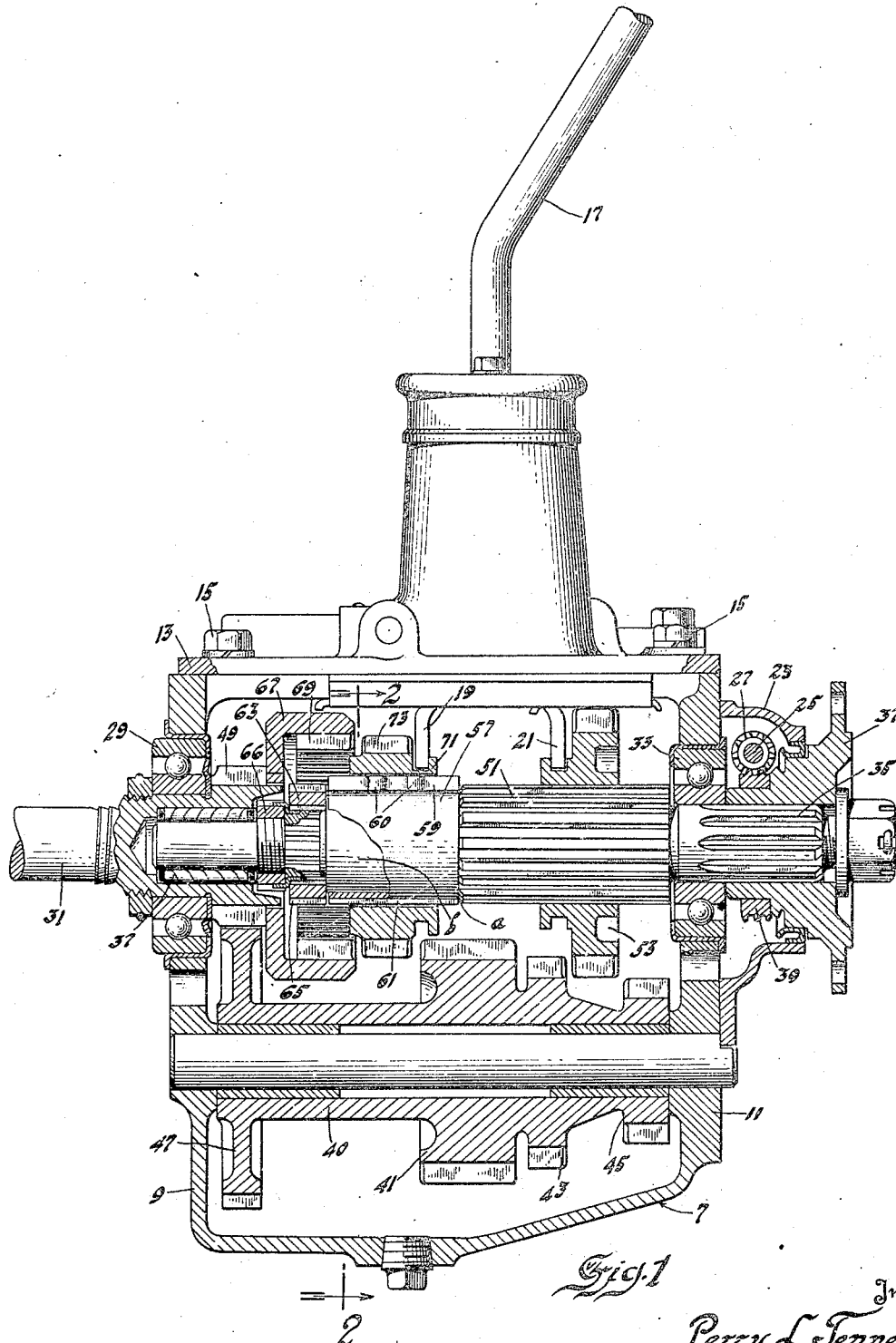
Figure 1 is a longitudinal section through a transmission casing incorporating our novel synchronizing mechanism.

Referring by reference characters to the several figures of the drawing, numeral 7 represents a transmission housing having a front wall 9 and a rear wall 11. The housing has a removable top 13 secured by fastening means 15. This top, or cover, may be formed with an upwardly directed enlargement for the conventional gear shift lever 17. The gear shift lever operates the conventional shift forks designated by numerals 19 and 21. At the rear end of the transmission housing there may be used a supplemental closure 23, within which is a transverse shaft 25 having a gear 27 to be driven by the driven shaft of the transmission, the shaft 25 being intended to actuate the usual speedometer located on the instrument board of the vehicle.

The front end of the transmission is provided with a bearing 29 for a driving shaft 31. This shaft is the shaft driven through the usual vehicle clutch by the motor of the motor vehicle. Through a bearing 33 in the rear wall, which bearing is aligned with bearing 29, passes a driven shaft or spline shaft 35. Outside the rear wall of the transmission, the driven shaft is provided with connecting means 37 by which it is secured to the conventional propeller shaft, not shown. Within the supplemental housing 23, shaft 35 is provided with a gear 39 for driving gear 27 to operate the speedometer. The front end of the shaft 35 is reduced and piloted within the rear enlarged end of driving shaft 31, there being used roller bearings 37.

The transmission is also provided with a conventional countershaft 40 having second speed gear 41, low speed gear 43, and a gear 45 for driving a reverse idler, not shown. The countershaft 40 is also provided with a gear 47 in constant driving engagement with a gear 49 carried on the rear enlarged end of driving shaft 31.

The driven shaft 35 is splined as at 51 and slidable on the splines is a low speed and reverse driven gear 53, moved by the fork 21 to engage the low speed driving gear 43 of the countershaft or the idler, not shown, driven by the reverse driving gear 45 of the countershaft.

In conventional three speed and reverse transmission gearing, there is another gear slidable on the driven shaft or spline shaft to engage the second speed gear of the counter-shaft and also to be moved into clutch engagement with the driving shaft. By far, the greater number of gear shifts are those made between second and high speed and the present invention modifies slightly the construction of the driven shaft and the second speed sliding gear, whereby these shifts may be made without noise and without damage to the gears, which noise and damage frequently occur since the shafts are not rotating at equal speeds.

The splines 51 on the driven shaft in the case of this invention are not continued to the front of the shaft, but only to a point designated by a. From that point to a point b the shaft is externally cylindrical and may be provided with oil grooves and is surrounded by a split sleeve 57, best shown in Figure 4. The sleeve 57 has parallel lips 59 provided with cams 60. It also has splines 61. Forwardly of sleeve 57 is a collar 63 having splines 65. Collar 63 is held in position rigidly by a nut 66. Collar 63 is made separate from the spline shaft only for convenience in manufacture and to permit the assembly of sleeve 57. A clutch member 67 is secured in any convenient manner to the rear end of the driving shaft 31. It has an overhanging portion with internal teeth 69 designed to at times engage the teeth of a clutch gear element 71.

Clutch gear element 71 corresponds in general to the second speed sliding driven gear in a conventional transmission. It is to clutch with internal teeth 69 when a direct drive is to be had, and to engage gear 41 when a drive in second speed is desired. The gear 71 in addition to its external teeth 73, which serve as clutch teeth and also as gear teeth when driving in second speed, has internal splines 75 as shown in Figure 6. These splines engage the splines 61 of sleeve 57 when gear 71 is assembled over sleeve 57. By this arrangement the gear 71 is slidable axially of sleeve 57, but is non-rotatably related to it. It should be remembered, also, that the sleeve 57 is freely rotatable about the unsplined portion of shaft 35.

Gear 71 has also a portion of its interior cut out in the region adjacent the lips 59 to permit the assembly of the gear over the sleeve. This space receives a pair of spring cams 74, one of these spring cams located on each side of the pair of lips 59. Each cam has terminal ends 76 received and held in grooves, one at each end of the gear 71. This construction is best shown in Figure 3. Each spring cam is centrally bowed between its end toward the adjacent lip, and normally positioned betwen the lip cams 60 is a cam 77 on the spring cam member 74. Preferably, to provide a better support for the spring cam members 74, each is formed with a lug 78 centrally positioned and resting on the surface of the underlying sleeve. The purpose of the cams 60 and 77 is to engage when the gear is moved along the sleeve and thereby compress the lips and frictionally engage the sleeve with the shaft 35. By the provision of the plurality of cams 60, this action of compression of the sleeve 57 upon the shaft occurs both when the gear is moved forwardly to make direct clutch engagement, and when it is moved rearwardly to effect a drive in second speed.

The operation of the novel synchronizing device may be briefly explained.

Assuming the parts to be in the position shown by Figure 1, the sliding gear element 71 used to secure a drive in high or in second speed is in neutral position. Its teeth 73 are in engagement neither with teeth 69 of the clutch, nor with the teeth of second speed gear 41. If it be desired, to shift into high, the vehicle clutch is released, as usual, allowing the driving shaft 31 to lessen its speed of rotation, the driven shaft 35 continuing to rotate owing to the momentum of the vehicle. Gear 71 is then moved axially along the sleeve into engagement with clutch teeth 69. Gear 71 with the sleeve is then turning about the driven shaft since the driving and driven shafts are rotating at unequal speeds and since gear 71 is locked to clutch member 67. A further movement of gear 71 effects the engagement of the spring cams 74 with the forward lip cams 60, as will be evident from an inspection of Figure 3. This engagement of the cams contracts the sleeve 57 snugly upon the driven shaft 35 and synchronizes the two shafts which are to be clutched together. A continued forward movement of the gear member 71 causes cam 77 to pass over and beyond cam 60 and thus frees the sleeve from the shaft 35. This allows a slight interval in which the positive driving internal splines 75 of gear 71 engage the forward splines of the driven shaft, i. e. the splines of sleeve member 63 secured to the driven shaft. Throughout these forward movements, the teeth 73 of sleeve member 71 remain, of course, in mesh with the teeth 69 of the clutch of the driving shaft. The gear member is thus first clutched to the driving shaft, the supporting sleeve running free on the driven shaft. The further movement effects synchronization through the cams, and finally after a momentary interval, the splines of the gear 71 and the sleeve 63 lock the member 61 fixedly to the driven shaft. Thereafter, as usual, the vehicle clutch may be brought into engagement to drive the propeller shaft at high speed.

In shifting from neutral into second speed, a reverse movement of gear 71 from that described takes place. The gear teeth 73 first engage the teeth of 41. Thereafter, the cams 77 engage the rearward cams 60 and contract the sleeve 57 upon the shaft and effect synchronization. Upon a further movement, cams 77 ride over the co-operating cams 60 and release the sleeve. After an interval, the final movement of the sleeve effects a clutched engagement between the internal splines 75 of gear member 71 with the splines 51 formed integral on the driven shaft 35.

By the above construction, the arrangement of aligned shafts and countershafts as conventionally employed is unchanged. The conventional low and reverse shifting arrangements remain as usual. A slight change in the forward end of the driven shaft provides for the spaced spline arrangement between which is located the rotatable clamping collar. The modified high and second speed gear is then arranged over this clamping collar. The construction is designed to make the clutch and gear engagement for high and second speed by sliding the gear element not directly on the driven shaft, but upon the rotatable sleeve with which it is non-rotatably associated. At an intermediate point in each movement forward or rearward from its neutral position it operates through the cam to clamp the sleeve upon the driven shaft and effect synchronization.

The construction has numerous advantages. The association of the synchronizer sleeve with the sliding gear eliminates added bearings, shafts, and shifting elements. It reduces to a minimum added weight and the change requires but little additional space. Lubrication is obviously simplified owing to the avoidance of additional moving parts.

The actuation of the synchronizer through the instrumentality of the conventional shift forks and shift lever eliminates extra parts and simplifies lubrication. The construction involving gear 71 and the sleeve 57 may be regarded as a unit which is independent of the remainder of the transmission, may be readily assembled and may be easily removed for inspection or replacement of parts.

The novel construction is at all times efficient, but most effective in cold weather and when the oil is heavy. It is double acting, functioning in a similar way both when shifting into high speed and when shifting into second speed.

The construction having these numerous advantages is extremely simple and economical to manufacture.

We claim:

1. In a change speed transmission, aligned shafts, the first shaft terminating in a clutch element, the second shaft having adjacent its end a splined portion, a member constituting a clutch member to co-operate with said first-mentioned clutch element, said member slidable axially of the second shaft, in one position freely rotatable about said shaft, in a second position rotatable about said shaft and in clutch engagement with said clutch element, and in a third position in engagement with the splined portion of the second shaft and also in clutch engagement with the clutch element of the first shaft, together with means whereby said member may be clamped to said second shaft in a position between its said second and third positions.

2. In a change speed transmission, a first shaft terminating in a clutch, a second aligned shaft having spaced spline portions, a third parallel shaft, gearing between the first and third shafts, a gear on the third shaft, a member having external teeth, said member slidable axially of the second shaft, in one neutral position freely rotatable about said second shaft, in second positions in opposite directions from neutral in engagement with said clutch and said countershaft gear respectively, and also freely rotatable on said second shaft, and in third or extreme positions in engagement with the splined portions of said second shaft and with the clutch of the second shaft or with the gear of the second shaft respectively, and means between each of said second and third positions whereby said member is held from rotation relative to said second shaft.

3. In a change speed transmission, aligned driving and driven shafts, said driving shaft having clutch means and said driven shaft having spaced splined portions, a countershaft, gearing between said drive shaft and said countershaft, a driving gear on said countershaft, a member rotatable about said driven shaft when in a position between said splined portions, movable axially into clutch engagement with the clutch means of the driving shaft or in driving engagement with the driving gear of the countershaft, and movable into extreme positions into additional locked engagement with one or the other of said splined portions of the driven shaft, means operated by said member in its sliding movement whereby it is frictionally held from rotation about the driven shaft at predetermined positions prior to and spaced from its positive engagement with the splined portions.

4. The invention defined by claim 3, said last-named means comprising a split sleeve between said splined portions and rotatable about said driven shaft, said member being slidable but non-rotatable on said sleeve and cam means operable upon relative axial movement of said sleeve and member to at times clamp said sleeve about said shaft.

5. In a transmission, a driven shaft having spaced spline portions, a split sleeve rotatable on said shaft between said portions, a gear non-rotatable on but slidable axially of said sleeve into splined connection with one or the other of said splined portions to thereby rotate positively with said driven shaft.

6. The invention defined by claim 5, together with resiliently operable clutch means associated with said sleeve and gear and operable by said relative axial movement to clamp said sleeve to said shaft at predetermined positions of relative adjustment of said sleeve and gear.

7. The invention defined by claim 5, the sleeve having spaced cams, said gear having resilient members provided with co-operating cams normally located between the sleeve cams, the engagement of said cams contracting said sleeve into frictional engagement with said shaft at predetermined positions between the intermediate position of said gear and the positions in which the gear is in engagement with said splines.

8. In a change speed transmission, a driving shaft, an aligned driven shaft, a parallel countershaft, means to drive the countershaft from the driving shaft, a driving gear on the countershaft, clutch teeth on the driving shaft, spaced splined portions on the driven shaft, a sleeve freely rotatable on said driven shaft between said splines, a toothed member slidable but non-rotatable on said sleeve, said tooth member constructed when moved in one direction to engage said clutch, and when moved in an opposite direction to engage said gear, mechanism associated with said toothed member and operable in predetermined positions of further movement in either direction to clamp said sleeve to said driven shaft to thereby effect synchronization, said toothed member when moved further into extreme positions maintaining the said clutch or gear engagement and also engaging one or the other of said splined portions.

9. The invention defined by claim 8, said mechanism including spaced cams carried by said sleeve, normally intermediate spring cams carried by said toothed member, the cams located so that their engagement to lock said sleeve occurs after the engagement of the toothed member with the clutch or gear and prior to the engagement with the splines of the driven shaft.

10. The combination of a driving and driven member, a toothed element on each of said members adapted to be intermeshed or released at will, one of said elements being free to rotate on one of said members, means for frictionally connecting said last-named element to said last-named member to effect synchronization, and means for subsequently positively connecting said element and member whereby the driven member may be driven from the driving member, the toothed elements being engaged both when the frictional means is active and when the positive connection is active.

11. The combination of a driving and driven member, a toothed element on each of said members adapted to be intermeshed or released at will, one of said elements being free to rotate on one of said members, and to slide thereon into intermeshing relation with said other element, and means responsive to the sliding movement of the element which is free to rotate and slide adapted to first frictionally connect said element with the member on which it is mounted, and thereafter to positively connect the element to the member on which it is mounted, said toothed elements being in intermeshing relation both when the sliding element is frictionally held and when it is positively connected to the member on which it is mounted.

12. In a change speed transmission, a driving shaft, a driven shaft, toothed members, one on each shaft whereby the driving shaft may drive the driven shaft, one of said toothed members being slidable and rotatable on its shaft, said toothed members being out of engagement in one position of sliding adjustment of the sliding toothed member, means to frictionally grip said sliding toothed member to its shaft in a second position of sliding adjustment, and means to positively connect said slidable toothed member to its shaft in a third position of sliding adjustment, said toothed members being in intermeshed engagement in each of said second and third positions of adjustment.

In testimony whereof we affix our signatures.

PERRY L. TENNEY.
HARRY E. FIDLER.